US006601237B1

(12) United States Patent
Ten Kate et al.

(10) Patent No.: US 6,601,237 B1
(45) Date of Patent: Jul. 29, 2003

(54) APPARATUS AND METHOD FOR RESCHEDULING PROGRAM CONFLICTS IN A VIRTUAL CHANNEL SCHEDULING GAP

(75) Inventors: Warner R. T. Ten Kate, Eindhoven (NL); Edwin A. Montie, Eindhoven (NL); Astrid M. F. Dobbelaar, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/469,876

(22) Filed: Dec. 22, 1999

(30) Foreign Application Priority Data

Dec. 23, 1998 (EP) .............................. 98204425

(51) Int. Cl.[7] .................................. G06F 3/00
(52) U.S. Cl. ........................ 725/47; 725/46; 725/49; 725/52; 725/54; 725/58; 386/83
(58) Field of Search ................... 725/46, 47, 49, 725/52, 54, 58; 386/83

(56) References Cited

U.S. PATENT DOCUMENTS

| 5,497,187 | A | * | 3/1996 | Banker et al. ............... 725/144 |
| 5,517,254 | A | | 5/1996 | Monta et al. ............... 348/569 |
| 5,534,911 | A | * | 7/1996 | Levitan ....................... 725/46 |
| 5,541,902 | A | | 7/1996 | Ten Kate ................. 369/47.13 |
| 5,585,838 | A | * | 12/1996 | Lawler et al. ................. 725/54 |
| 5,684,525 | A | * | 11/1997 | Klosterman ................. 725/48 |
| 5,731,844 | A | * | 3/1998 | Rauch et al. ................. 725/40 |
| 5,734,444 | A | * | 3/1998 | Yoshinobu .................... 725/14 |
| 5,907,322 | A | * | 5/1999 | Kelly et al. ................... 725/51 |
| 6,005,562 | A | * | 12/1999 | Shiga et al. ................. 345/721 |
| 6,133,909 | A | * | 10/2000 | Schein et al. ............... 345/721 |
| 6,141,488 | A | * | 10/2000 | Knudson et al. .............. 386/83 |
| 6,321,382 | B1 | * | 11/2001 | Wugofski ..................... 725/59 |
| 6,414,720 | B1 | * | 7/2002 | Tsukidate et al. ........... 348/469 |
| 6,438,752 | B1 | * | 8/2002 | McClard ...................... 725/46 |

OTHER PUBLICATIONS

Wood et al, Digital Recording and Playback, May 16, 2002, US 2002/0057893 A1.*
Wood et al, Video Data Recorder with for Recording Predefined Format Shows, Feb. 6, 2003, US 2003/0044165.*
Wood et al, Video Data Recorded with Personal Channels, May 9, 2002, US 2002/0054752 A1.*
Mankovitz, Apparatus and Method for Television Program Scheduling, Jul. 11, 2002, US 2002/0090203 A1.*

* cited by examiner

Primary Examiner—Andrew Faile
Assistant Examiner—Jason Chung
(74) Attorney, Agent, or Firm—Laurie E. Gathman

(57) ABSTRACT

The invention relates to an apparatus for receiving programs from a plurality of channels, comprising a tuner for tuning to any of the plurality of channels, and an electronic program guide (EPG) for presenting a schedule of the programs. The apparatus comprises virtual channel means for creating a user selectable virtual channel for reproducing selected programs from various genuine channels. The virtual channel means are adapted to control the tuner to tune to a channel currently broadcasting a selected program. When a user selects the virtual channel, the apparatus takes care of automatically switching between the genuine channels broadcasting the programs viewed on the virtual channel. As a consequence, the user can view the desired programs by simply selecting the virtual channel.

20 Claims, 3 Drawing Sheets

| SDT | EIT | EIT |
|---|---|---|
| Stream 1 | Service 1 | Service 2 |
| Service 1 | Event 11 | Event 21 |
| Service 2 | Event 12 | Event 22 |
| Service 3 | Event 13 | Event 23 |
| Service 4 | Event 14 | Event 24 |
| ... | Event 15 | Event 25 |
| ... | ... | ... |

FIG. 2A

| SDT | EIT | EIT |
|---|---|---|
| Stream 1 | Personal Service 1 | Personal Service 2 |
| Service 1 | Event 11 | Event 21 |
| Service 2 | Event 22 | Event 12 |
| Service 3 | Event 24 | Event 13 |
| Service 4 | Event 15 | Event 24 |
| Personal Service 1 | ... | ... |
| Personal Service 2 | ... | ... |

FIG. 2B

APPARATUS AND METHOD FOR RESCHEDULING PROGRAM CONFLICTS IN A VIRTUAL CHANNEL SCHEDULING GAP

FIELD OF THE INVENTION

The invention relates to an apparatus for receiving programs from a plurality of channels, comprising a tuner for tuning to any of the plurality of channels, and electronic program guide (EPG) means for presenting a schedule of the programs, the EPG means being adapted to present a schedule of a subset of said programs as being ostensibly scheduled for a personal channel.

The invention further relates to a method of receiving programs from a plurality of channels, comprising a step of presenting a program schedule for each channel, and a step of presenting a schedule of a subset of said programs as being ostensibly scheduled for a personal channel.

BACKGROUND OF THE INVENTION

An apparatus as defined above is known from U.S. Pat. No. 5,517,254. The known apparatus comprises an electronic program guide (EPG) for presenting a schedule of the programs. The EPG is presented to the viewer as a time-channel matrix, each column comprising a schedule for a particular channel at a particular day. The EPG enables a user to select desired programs to be recorded or to be reminded of. The apparatus may select programs automatically as a recommendation when they meet certain criteria. Channels may be presented in different order, e.g. in accordance with the number of selected programs. In a particular embodiment, all selected programs are collected in one column, as if they were scheduled for an ostensible personal channel, thus providing a quick overview of the selected programs.

OBJECT AND SUMMARY OF THE INVENTION

It is an object of the invention to provide an apparatus as defined above, providing improved ease-of-use with respect to selecting desired programs. To this end, the apparatus according to the invention is characterized in that the apparatus further comprises virtual channel means for creating a user selectable virtual channel for reproducing the programs of said subset, the apparatus being adapted to control the tuner to tune to a channel currently broadcasting a program of said subset. In this way, it is achieved that the user can actually select a virtual channel broadcasting the programs of the personal channel. The apparatus takes care of automatically tuning to the genuine channels broadcasting the programs compiled in the virtual channel. As a consequence, the user can view the desired programs by simply selecting the virtual channel, i.e. the virtual channel does not only provide a overview of selected programs, but also allows the programs to be navigated to automatically. No further user action is required, hence the usability of the apparatus is improved.

An advantageous embodiment of the apparatus according to the invention applies to digital television broadcasting, the channels being services of a digital broadcast stream which comprises for each respective service a service description relating a service identification to a plurality of program identifications The embodiment is characterized in that the virtual channel means are adapted to insert a new service description into the broadcast stream, the new service description relating a new service identification to a plurality of program identifications identifying the programs of the virtual channel. In this way the virtual channel is created by merely manipulating the information tables describing the digital broadcast stream. Other components need not be adapted, since they perceive the additional virtual channel as a genuine channel. For example, the EPG will display the virtual channel as all other channels and when the user selects the virtual channel the apparatus will automatically select the right programs from the broadcast stream, since the virtual channel comprises program pointers which are duplicated from the original channels.

A preferred embodiment applies to the Digital Video Broadcasting (DVB) standard, which is widely applied. This embodiment is characterized in that the broadcast stream is a stream conformant to the Digital Video Broadcast (DVB) specifications, the service descriptions constituting the Service Description Table (SDT) of the DVB Service Information (SI). The virtual channel is created by inserting a new entry in the SDT, comprising a new service identification and duplicated pointers to the selected programs.

When programs are collected from multiple genuine channels, it may occur that some of the programs are broadcast simultaneously, hence cannot be viewed at the same time. An embodiment is characterized in that the apparatus further comprises scheduling means for assigning priority ratings to the programs of the virtual channel, for selecting a first program in favor of a second program when they are broadcast simultaneously and the first program has a higher priority rating than the second program. The priority ratings may be supplied by the user or assigned by the apparatus based on a user profile. For example, when the user has previously shown more interest in news programs than in sports programs, the system may assign a higher priority rating to the first category. The priority ratings are then used to decide which of the programs broadcast simultaneously have to be selected. An alternative embodiment is characterized in that the scheduling means are further adapted to record the second program, and reschedule it for the virtual channel to fill a gap before or after the programs scheduled for the virtual channel.

In this way the program which is of less interest to the user is recorded on a video recorder, and when at a later moment a substantial gap occurs in the schedule of the virtual channel, the recorded program is rescheduled to fill that gap. The apparatus is adapted to find the program on the video recorder and replay it at the appropriate time. Alternatively, the program with the highest priority rating could be recorded on the video recorder, ensuring that the user acquires a copy of the program which can be viewed even if the user is unable to watch the program when it is being broadcast.

An embodiment is characterized in that the virtual channel means are further adapted to store an identification of a default channel, and control the tuner to tune to said default channel when there is no program scheduled for the virtual channel. This provides an alternative way of filling gaps in the schedule of the virtual channel. When the user has selected the virtual channel while there is no program scheduled for that moment the tuner is controlled to tune to the default channel, but as soon as a program scheduled for the virtual channel starts, the tuner is controlled to tune to the genuine channel broadcasting said program.

An embodiment is characterized in that the apparatus further comprises user operable editing means for editing the priority ratings and/or the identification of the default channel and/or removing programs from and adding programs to the virtual channel. In this way, the user is enabled to control the program schedule of the virtual channel.

The automatic switching between genuine channels could be controlled by a clock in accordance with the start and stop times of the scheduled programs, or alternatively by processing signals from a service provider which indicate the start and stop times, e.g. signals of the Program Delivery Control (PDC) system.

An embodiment is characterized in that the virtual channel means are further adapted to create further user selectable virtual channels. For example, each member of a household may have a private virtual channel, possibly password protected. Alternatively, each virtual channel may be dedicated to programs of a particular category, e.g. there may be a virtual comedy channel, a virtual sports channel etc.

The invention is particularly suitable for television receivers, set-top boxes and video recorders, but could also be applied to radio receivers.

BRIEF DESCRIPTION OF THE DRAWINGS

These and other aspects of the invention will be apparent from and elucidated by way of a non-limitative example with reference to a drawing in which:

FIGS. 2a and 2b show examples of adaptations to DVB-SI information tables for creating a virtual channel.

DESCRIPTION OF EMBODIMENTS

Figure 1:
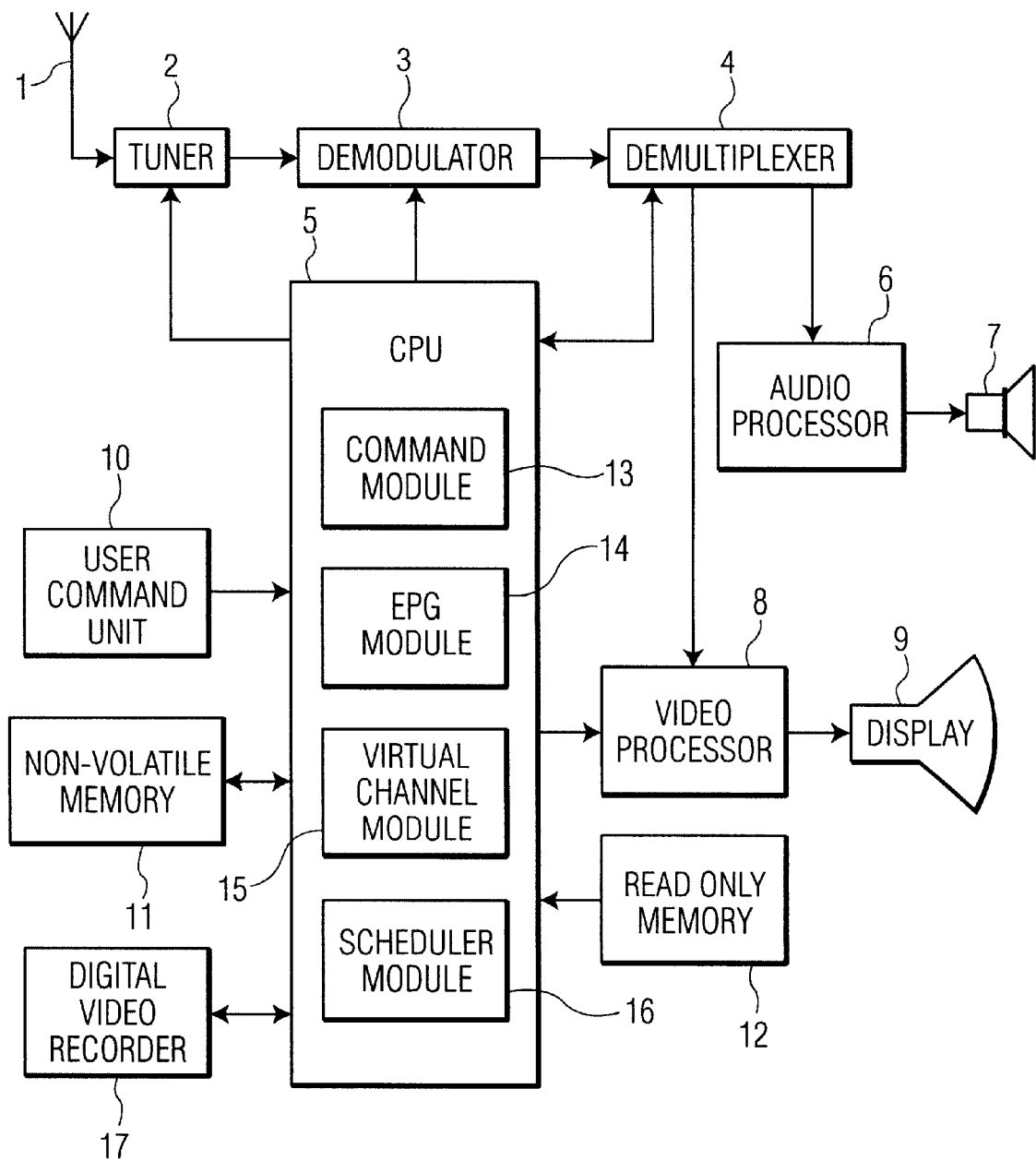
FIG. 1 shows a diagram of a digital television receiver as an embodiment of the apparatus according to the invention.

FIG. 1 shows a block diagram of a digital television receiver as an embodiment of the apparatus according to the invention. Digital broadcast streams, modulated upon radio frequency (RF) signals, are received from the ether by an antenna 1 or, alternatively, from a cable network. The broadcast streams may be formatted, for example, in accordance with the Digital Video Broadcasting (DVB) standard. A tuner 2 comprises a standard analog RF receiving device which is capable of receiving said RF signals and selecting one of them to be output to a demodulator 3. Which signal tuner 2 selects is dependent upon control data received from a central processing unit (CPU) 5. The demodulator 3 converts the analog signal into a digital packet stream, based on control signals received from the CPU 5. This packet stream is then output to a demultiplexer 4, which selects packets belonging to a particular program in accordance with control data received from the CPU 5, and decomposes the packet stream into elementary video, audio or data streams.

In an alternative embodiment of the invention, the packet stream is output from demodulator 3 directly to the CPU 5. In this embodiment, the CPU 5 performs the tasks of the demultiplexer 4, thereby eliminating the need for the demultiplexer 4.

A video processor 8 decodes the video stream received from the demultiplexer 4 or from the CPU 5. In preferred embodiments of the invention, the video processor 8 is an MPEG-2 decoder; however, any decoder may be used as long as the decoder is compatible with the type of coding used to code the video data. Decoded video data is then transmitted to a display screen 9. An audio processor 6 decodes the audio stream received from the demultiplexer 4. Again, any decoder may be used as long as the decoder is compatible with the type of coding used to code the audio data. Decoded audio data is then transmitted to a speaker system 7.

The demultiplexer 4 outputs the elementary data stream to the CPU 5. The elementary data stream has two types of data: control data and content data. Content refers to, e.g., interactive programs; control refers to tables in the multiplex which specify matters like the structure of the multiplex, the (RF) frequencies at which the channels are modulated, and the addresses at which the various content components and the (other) tables in the multiplex can be found. The CPU 5 comprises one or more microprocessors capable of executing program instructions stored in a read-only memory (ROM) 12. These program instructions comprise parts of software modules including, inter alia, a command module 13, an EPG module 14, a virtual channel module 15 and a scheduler module 16. Data processed by said software modules, e.g. DVB-SI data and user profile information, may be stored in a non-volatile memory 11. The command module 13 is capable of controlling functions of the TV-set, like tuning and demultiplexing selection, and transmitting data to the video processor 8 to be presented on the screen 9. A user command unit 10 receives user commands, e.g. through a remote control (not shown), and transmits them to the command module 13 to be processed. For example, when the user enters a channel number, the command module 13 controls the tuner 2 and the demultiplexer 4 to select the corresponding broadcast stream and data packets therein, and sends graphical data to the video processor 8 to present feedback on the screen 9, e.g. the preset number, the channel name being displayed for a few seconds.

A digital video recorder 17 is controlled by the CPU 5, and capable of storing and reproducing programs and DVB-SI data. It may be built in the television receiver or be a separate device under control of the television receiver.

Digital broadcast streams comprise information for describing the structure of the broadcast stream and generating navigation user-interfaces. For example, a DVB broadcast stream comprises Program Specific Information (PSI, part of the MPEG specifications) and SI information, necessary, inter alia, for decoding the program information and generating an electronic program guide. Specifications of the DVB standard are widely available and well known to those of ordinary skill in the art. Descriptions thereof are provided only if relevant for explaining the present invention.

The EPG module 14 interprets the DVB-SI data received from the demultiplexer 4 to collect information about the services available in the received broadcast streams and about the events scheduled for those services (DVB services are considered to be equivalent to the conventional notion of TV channels, while DVB events correspond to TV programs). For that purpose, the SI data comprises, for each broadcast stream, a Service Description Table (SDT) listing the names and other parameters of the services, or channels, available for that broadcast stream. For each service, an Event Description Table (EIT) describes the names and other parameters of events, or programs, scheduled for that service. The EPG module 14 uses the information from the SDT and EIT to generate an on-screen overview of programs scheduled for the channels in the received broadcast streams. It also allows the user to select programs to be viewed, recorded or reminded of. References to the selected programs are stored in the memory 11, which can be accessed by the virtual channel module 15. The virtual channel module 15 is capable of creating one or more virtual channels, featuring said selected programs stored in the memory 11. The creation of said virtual channels is accomplished by manipulating the PSI and SI tables in such a way that the command module 13 and the EPG module 14 automatically recognize the new channels, thus evading the need for substantial adaptations of said modules.

FIG. 2 schematizes the way SDT and EIT are adapted to create two virtual channels and schedule programs from genuine channels for the new virtual channels. FIG. 2a shows the situation before the adaptation. The SDT lists four services for a broadcast stream 1. For two of those services an EIT section is shown, listing five events for both of them. FIG. 2b shows the situation after the adaptation. Two new services are added to the SDT, e.g. each being a private virtual channel of a different household member. The names of the new services may be generated by the virtual channel module 15 or supplied by the user. For both new services a new EIT section is created. The entries of the new EIT sections are duplicated from the original entries of the existing EIT sections. As can be seen, one event, in this case Event 24, may occur in multiple virtual channels.

Figures 3, 4:
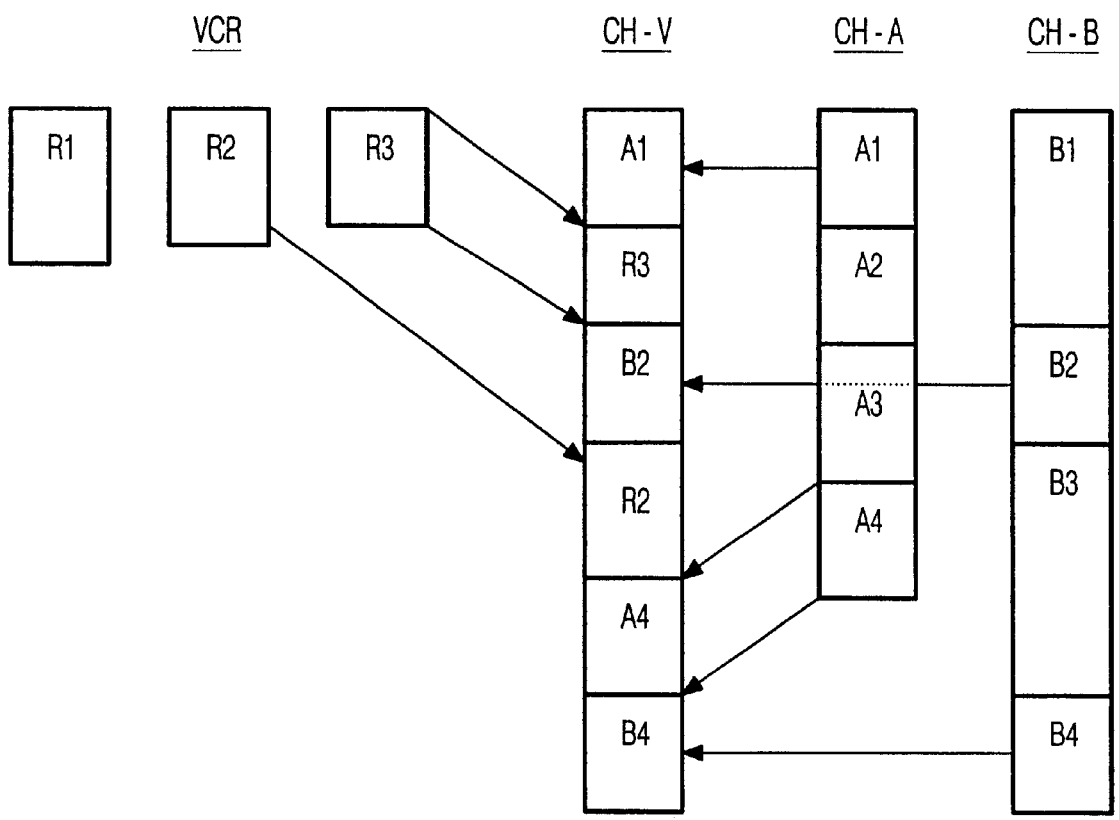
FIG. 3 shows examples of adaptations to DVB-PSI information tables for creating a virtual channel.
FIG. 4 shows the composition of a program schedule for a virtual channel.

An EPG generated by the EPG module 14 in accordance with the adapted SI tables automatically shows the two new services. The events of the virtual channels are presented at least twice, because they are also scheduled for one of the genuine channels. To ensure that 'tuning' to a virtual channel automatically causes the appropriate events to be selected, similar adaptations should be made to the (MPEG part) PSI tables. Each program in the broadcast stream is described by an entry in a Program Association Table (PAT) and a corresponding section of a Program Map Table (PMT) which relates a program to the elementary data streams which constitute the program. Each entry in the SDT comprises a service identification which corresponds to a program identification in the PSI information. In order to bring the PSI information into agreement with the SI information, a new entry is added to the PAT and a new section is added to the PMT. FIG. 3 shows the situation after creating two virtual channels. The PAT is extended with program identifications which are identical to the identifications of the new services in the SDT, and two new PMT sections (only one of which is shown) are added referring to the newly added program identifications. The identifications of the elementary streams of the newly created PMT sections are duplicated from the PMT sections corresponding to the genuine channels. By adapting the PSI tables in this way, the demultiplexer 4 perceives the new virtual channels as ordinary broadcast channels, hence the virtual channels are processed just as normal channels.

For the sake of simplicity, only services belonging to one broadcast stream have been considered until now. However, it is noted that programs of services located in multiple broadcast stream may be scheduled for a single virtual channel. For every broadcast stream, the SDT comprises an entry for said virtual channel, while the EIT comprises sections with the events which are to be broadcast through said broadcast stream. Another DVB feature, the Bouquet Association Table (BAT) could be used to correlate the various parts of information related to the virtual channels. A BAT gives a logical grouping of services into bouquets, which may group together services delivered by different broadcast streams. Since the information related to a virtual channel may be organized across various SDT tables, the BAT provides a convenient instrument to assist operation and improve performance.

Because programs of a virtual channel may be obtained from multiple genuine channels, the schedule of the virtual channel is likely to comprise gaps and overlaps between the programs. In order to fill a gap, the virtual channel module 15 is capable of controlling the tuner 2 and the demultiplexer 4 to select a default channel. The identification of the default channel is stored in the memory 11, and may be chosen or altered by the user, by means of editing means which are constituted by the user command unit 10 and an on-screen menu generated by the virtual channel module 15. In order to deal with overlaps, the scheduler module 16 maintains a user profile for deciding which programs are likely to be preferred by the user and assign priority ratings accordingly. The user profile may be specified by means of habit watching or explicit user input. Dependent on the sophistication of the video recorder 17, various options for dealing with gaps and overlaps are available. If the video recorder 17 is disconnected or has no storage capacity available, and a time conflict occurs between two or more programs, the one with the highest priority rating is selected for display. If storage capacity is available, the programs having the lower ratings are recorded onto the video recorder 17. The scheduler module 16 further maintains a database of information about the programs available on the video recorder 17, e.g. their title, duration and program category. If a gap is encountered in the schedule of the virtual channel, the scheduler module 16 searches the database for recorded programs having a length which is substantially equal to the length of the gap. If such programs are found, one of them is scheduled for the virtual channel to fill the gap. Alternatively, various shorter recorded programs are combined to fill the gap, or a longer recorded program is split into several parts, each filling a different gap in the schedule of the virtual channel, e.g. before and after a news bulletin. The scheduler module 16 may control the video recorder 17 to reproduce a program with slightly increased speed if it is just too long to fill a gap, in order to fill the gap exactly or leave a small pause of predetermined length, e.g. 5 minutes. Similarly, a program which is just too short to fill a gap may be reproduced with slightly decreased speed, to avoid long pauses between programs. If the video recorder 17 is capable of simultaneously recording a first program and reproducing a second program, a broadcast program may be shifted in time so that it starts only when the reproduction of a recorded program has ended. The scheduler module 16 is thus capable of solving time conflicts between programs which are broadcast via the received broadcast streams, by time-shifting the programs or inserting recorded programs.

FIG. 4 shows the composition of a program schedule for a virtual channel CH-V comprising programs from a video recorder VCR and two broadcast streams CH-A and CH-B. Program A1 from CH-A and program B2 from CH-B are scheduled for CH-V, leaving a gap between them. Program R3 from VCR is scheduled to fill that gap. Because the length of R3 is slightly longer than the length of the gap, the reproduction speed of R3 is increased to make it end a few minutes before the start of B2. Program R2 from VCR is scheduled after B2, and program A4 from CH-A is scheduled after R2, which is achieved by shifting it in time, i.e. recording it while VCR is reproducing R2. When R2 ends, VCR starts reproducing A4, while still recording the remainder of A4. The reproduction speed of A4 is increased to make up for the lost time, so that the subsequent program B4 need not be shifted in time anymore.

Although the invention has been described with reference to particular illustrative embodiments, variations and modifications are possible within the scope of the inventive concept. Thus, for example, the various software modules may be implemented and combined in several ways or located in different devices, e.g. a set-top box or a video recorder. The video recorder 17 may be a conventional video cassette recorder or an optical recording system. It may comprise a fast disk-cache or several read/write mechanisms for simultaneous recording and play-back. It may have an automatic loading mechanism for loading exchangeable data carriers such as video tapes and optical discs. Alternatively, the apparatus may generate messages to request the user to exchange data carriers.

In summary, the invention relates to an apparatus for receiving programs from a plurality of channels, comprising a tuner for tuning to any of the plurality of channels, and an electronic program guide (EPG) for presenting a schedule of the programs. The apparatus comprises virtual channel means for creating a user selectable virtual channel for reproducing selected programs from various genuine channels. The virtual channel means are adapted to control the tuner to tune to a channel currently broadcasting a selected program. When a user selects the virtual channel, the apparatus takes care of automatically switching between the genuine channels broadcasting the programs viewed on the virtual channel. As a consequence, the user can view the desired programs by simply selecting the virtual channel.

We claim:

1. An apparatus for receiving programs from a plurality of channels, comprising a tuner for tuning to any of the plurality of channels, and electronic program guide (EPG) means for presenting a schedule of the programs, the EPG means being adapted to present a schedule of a subset of said programs as being ostensibly scheduled for a personal channel, wherein the apparatus further comprises virtual channel means for creating a user selectable virtual channel for reproducing the programs of said subset, the apparatus being adapted to control the tuner to tune to a channel currently broadcasting a program of said subset;
   wherein the apparatus further comprises scheduling means for assigning priority ratings to the programs of the virtual channel, for selecting a first program in favor of a second program when they are broadcast simultaneously and the first program has a higher priority rating than the second program; and
   wherein the scheduling means are further adapted to record the second program, and reschedule it for the virtual channel to fill a gap before or after the programs scheduled for the virtual channel.

2. An apparatus as claimed in claim 1, the channels being services of a digital broadcast stream which comprises for each respective service a service description relating a service identification to a plurality of program identifications, wherein the virtual channel means are adapted to insert a new service description into the broadcast stream, the new service description relating a new service identification to a plurality of program identifications identifying the programs of the virtual channel.

3. An apparatus as claimed in claim 2, wherein the broadcast stream is a stream conformant to the Digital Video Broadcast (DVB) specifications, the service descriptions constituting the Service Description Table (SDT) of the DVB Service Information (SI).

4. An apparatus as claimed in claim 1, wherein the virtual channel means are further adapted to store an identification of a default channel, and control the tuner to tune to said default channel when there is no program scheduled for the virtual channel.

5. An apparatus as claimed in claim 1, wherein the apparatus further comprises user operable editing means for editing the priority ratings and/or the identification of a default channel and/or removing programs from and adding programs to the virtual channel.

6. An apparatus as claimed in claim 1, wherein the virtual channel means are further adapted to create further user selectable virtual channels.

7. An apparatus as claimed in claim 1 wherein said second program is displayed at an increased speed on said virtual channel when said second program is too long to fit within said gap between programs in said virtual channel.

8. An apparatus as claimed in claim 1 wherein said second program is displayed at a decreased speed on said virtual channel when said second program is too short to fill said gap between programs in said virtual channel.

9. An apparatus as claimed in claim 1 wherein said second program is time shifted so that said second program is displayed on said virtual channel after an end of a previous program on said virtual channel.

10. An apparatus as claimed in claim 9 wherein a first portion of said time shifted second program is displayed on said virtual channel while a second portion of said time shifted second program is simultaneously recorded for later display on said virtual channel.

11. A method of receiving programs from a plurality of channels, comprising the steps of:
   presenting a program schedule for each channel; and
   presenting a schedule of a subset of said programs as being ostensibly scheduled for a personal channel;
   wherein the method further comprises the steps of:
      creating a user selectable virtual channel for reproducing the programs scheduled for the personal channel;
      assigning priority ratings to said programs of said virtual channel;
      selecting a first program in favor of a second program when the first program and the second program are broadcast simultaneously and the first program has a higher priority than the second program;
      recording the second program; and
      rescheduling said second program for the virtual channel to fill a gap before or after the programs scheduled for the virtual channel.

12. A method as claimed in claim 11, the channels being services of a digital broadcast stream which comprises for each respective service a service description relating a service identification to a plurality of program identifications, wherein the method further comprises a step of inserting a new service description into the broadcast stream relating a new service identification to a plurality of program identifications identifying the programs of the virtual channel.

13. A method as claimed in claim 12 wherein the broadcast stream is a stream conformant to the Digital Video Broadcast (DVB) specifications, the service descriptions constituting the Service Description Table (SDT) of the DVB Service Information (SI).

14. A method as claimed in claim 11 further comprising the steps of:
   using said virtual channel means to store an identification of a default channel; and
   controlling the tuner to tune to said default channel, when there is no program scheduled for the virtual channel.

15. A method as claimed in claim 11 further comprising the step of:
   using user operable editing means to one of:
      edit the priority ratings, edit the identification of a default channel, remove programs from the virtual channel, and add programs to the virtual channel.

16. A method as claimed in claim 11 further comprising the step of:

using the virtual channel means to create further user selectable virtual channels.

17. A method as claimed in claim 11 further comprising the step of:

displaying said second program at an increased speed on said virtual channel when said second program is too long to fit within said gap between programs in said virtual channel.

18. A method as claimed in claim 11 further comprising the step of:

displaying said second program at a decreased speed on said virtual channel when said second program is too short to fill said gap between programs in said virtual channel.

19. A method as claimed in claim 11 further comprising the step of:

time shifting said second program so that said second program is displayed on said virtual channel after an end of a previous program on said virtual channel.

20. A method as claimed in claim 19 further comprising the step of:

displaying a first portion of said time shifted second program on said virtual channel while simultaneously recording a second portion of said time shifted second program for later display on said virtual channel.

* * * * *